April 22, 1941.  F. B. HUNTER  2,239,098
MULTIPLE VALVE FOR INVERTIBLE TANKS
Filed June 10, 1939
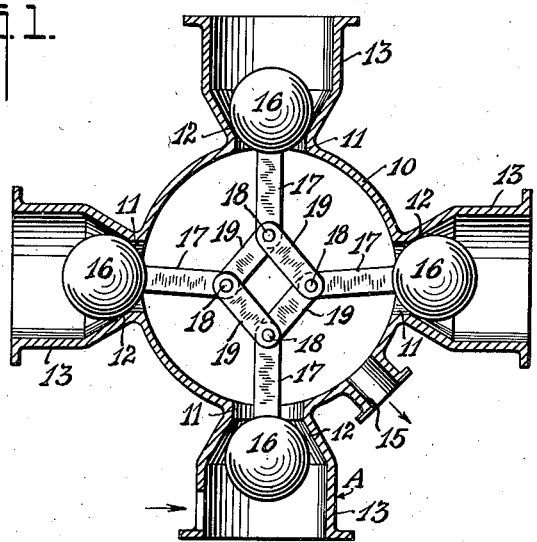
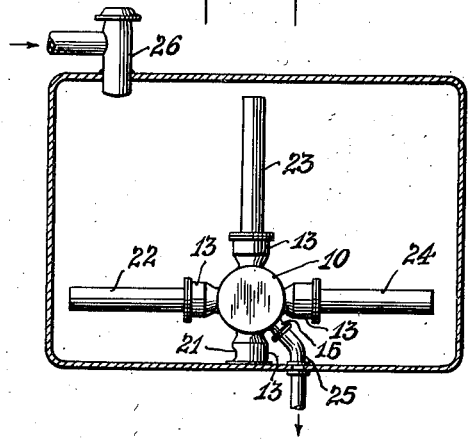
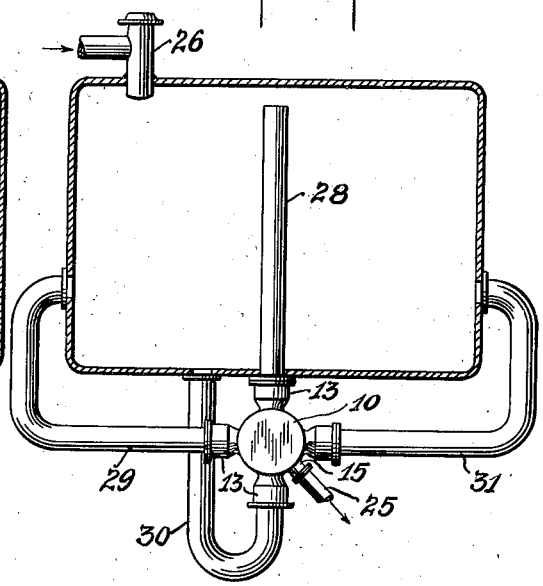
INVENTOR
FRANK B. HUNTER
BY
ATTORNEY Patented Apr. 22, 1941

2,239,098

UNITED STATES PATENT OFFICE 2,239,098

MULTIPLE VALVE FOR INVERTIBLE TANKS

Frank B. Hunter, Wyckoff, N. J., assignor to Wright Aeronautical Corporation, a corporation of New York Application June 10, 1939, Serial No. 278,406

10 Claims. (Cl. 137—21)

This invention relates to automatic tank outlet valves, particularly useful in connection with aircraft oil tanks which are subject to inversion and forward and rearward tilting during maneuvering of the aircraft. The invention is also adapted for use, however, with aircraft fuel tanks and with any other tankage subject to variation in its position.

An object of the invention is to provide an automatic valve for a tank outlet which shall position itself to allow fluid withdrawal from the tank from the lowermost point thereof.

A further object is to provide a tank having a plurality of withdrawal conduits in the various parts thereof in conjunction with a unitary valve connected to said conduits and adapted during operation to automatically select that conduit which is at the lowest point in the tank.

A further object is to provide a specific multiple inlet automatic valve adapted for use as a built-in part of a tank, or for separate application to the tank.

A further object is to provide a system of automatic valve operation which is adaptable in principle for use with a tank having three or more outlet conduits.

Further objects and advantages will be apparent from a reading of the subjoined specification and claims, and from an examination of the accompanying drawing, in which:

Fig. 1 is a section through the unitary valve of the invention;

Fig. 2 is a section through a tank showing the valve installed therewithin, and

Fig. 3 is a section through a tank showing the valve installed exteriorly thereof.

Referring first to Fig. 1, I show a substantially cylindrical valve housing 10 having four equally circumferentially spaced openings 11 therein, these openings forming tapered external valve seats at 12, which valve seats extend outwardly as fittings 13 to which conduits may be secured. The housing 10 is provided with an additional outlet opening and fitting 15 which may be disposed between openings 11 as shown, or in any other convenient location on the housing 10.

Engageable with each valve seat 12 is a ball valve 16 having a stem 17 projecting into the interior of the housing. The inner end of each stem is provided with a crosspin 18 on which links 19 are pivoted, the links forming an articulated connection between each valve stem and its adjacent valve stems. In operation, the lowermost valve 16, as at A, falls away from its seat 12 and is suspended upon its stem 17 from the several links 19. The downward force exerted thereby pulls the lateral balls inwardly into engagement with their seats and likewise pulls the uppermost ball firmly against its seat, the parallelogram formed by the four links 19 serving to distribute the weight of the lowermost valve ball quite uniformly between the other valve balls. If the housing 10 be tilted or inverted, it is apparent that the lowermost valve ball will always drop from its seat, and in so doing will promptly hold the other valve balls against their respective seats. In the above description, reference has been made to the opening of the lowermost valve ball which would be the situation if gravity is the only force acting upon the system. However, if the system is subjected to other unbalanced forces due to acceleration, the position of the valves will be responsive to the direction of action of the resultant unbalanced force.

In applying the valve system to specific tankage, reference may be made to Fig. 2 in which the lowermost fitting 13 is secured to the tank bottom, and a hole 21 is formed in the conduit to permit of fluid passage to the valve. The other fittings 13 are respectively provided with conduits 22, 23 and 24 extending to the forward, upper and rearward walls of the tank. The exit fitting 15 connects with the outlet conduit 25. The tank carries an inlet fitting 26 which may likewise comprise a filler opening for the tank.

Referring to Fig. 3, the valve is shown as being secured to the exterior of the tank through means of the uppermost fitting 13. In this instance, a conduit 28 extends upwardly from the uppermost fitting 13 toward the top of the tank, and the other fittings are connected by conduits 29, 30 and 31 to the forward, lower and rearward walls of the tanks.

It is deemed to be within the province of the invention to use a linkage system such as that shown for a valve system in which more than four valves are used, the articulated polygon form of the links resulting from a plurality greater than four still securing the desired opening of the lowermost valve and closing of the other valves. The use of the terms forward, rearward, upper and lower relating to tank attitude are purely relative for descriptive purposes, and no limitation is implied thereby, since the side opening fittings 13 of the valve housing might be connected to lateral portions of a tank rather than to fore and aft portions.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An outlet valve for a tiltable and invertible tank comprising a housing having an outlet opening and having a plurality of at least four valve seat openings spaced uniformly around the housing, a valve on each seat having a stem extending into the housing, and links pivotally attaching each said stem to the adjacent stems.

2. An outlet system for an invertible and tiltable tank comprising a housing, valve seats on said housing at spaced positions thereon, valves at said seats movable inwardly to close and outwardly to open the valve seat openings, and an equilateral polygon within the housing comprising articulated links pivoted at the polygon apices to respective valves inwardly of their seats, said housing having an outlet connection adapted to communicate with a tank.

3. A valve comprising a housing having at least three openings each opening defining a valve seat, a valve for each seat, and means loosely articulating said valves to one another for movement of any one valve into unseated position while moving the others into engagement with their seats.

4. In a tiltable valve housing having plural openings therein and in which bottom opening only is desired, a valve seatable exteriorly on the housing to cover each opening, and an articulated polygonal linkage within the housing pivotally connected to each valve, whereby the weight of the lowermost valve when the housing is tilted unseats same and urges the other valves, through said linkage, to seated positions.

5. A tiltable valve unit comprising a hollow housing having outlet members radiating in different directions therefrom, a valve seat on the outside of the housing and at the juncture of each member with the housing, a valve seatable on each seat having a stem projecting through the seat into the housing, and substantially similar links articulately connecting each valve stem with immediately adjacent valve stems.

6. In a tank adapted to be used in upright, forwardly or rearwardly tilted or inverted positions, an outlet valve therefor comprising a housing having bottom, top, front and rear openings, a valve at each opening seatable exteriorly of the housing, a quadrilateral linkage within the housing articulated at its corners to respective valves by means passing through respective openings, whereby the lowermost valve hangs on the linkage and off its seat and, by its free weight urges the then upper, forward and rearward valves into engagement with their seats, and an outlet connection entering said housing.

7. A tiltable valve unit comprising a housing having a plurality of openings comprising valve seats, said housing having an additional independent opening, a valve for each seat, and articulated linkage connected to all of said valves and organized to impose valve closing force on all other valves in response to the weight of one open valve.

8. A tiltable valve unit comprising a housing having a plurality of openings comprising valve seats, said housing having an additional independent opening, a valve for each seat, and articulated linkage connected to all of said valves and organized to impose valve closing force on all other valves in response to the weight of one open valve, the opening at the open valve and said independent opening providing for fluid flow through the unit.

9. A tiltable valve unit comprising a housing having a plurality of openings comprising valve seats, said housing having an additional independent opening, a valve for each seat, articulated linkage connected to all of said valves and organized to impose valve closing force on all other valves in response to the weight of one open valve, the opening at the open valve and said independent opening providing for fluid flow through the unit.

10. A valve comprising a tiltable housing having at least three openings each defining a valve seat, a valve for each seat, and means loosely articulating said valves to one another for movement of any one valve into unseated position in response to tilt of the housing while moving the other valves into engagement with their seats.

FRANK B. HUNTER.